United States Patent [19]

Guenther et al.

[11] Patent Number: 5,109,336
[45] Date of Patent: Apr. 28, 1992

[54] UNIFIED WORKING STORAGE MANAGEMENT

[75] Inventors: Robert L. Guenther; Stephen B. Rondeau, both of Kingston; Joseph P. Spano, Red Hook; Paul W. Van Leer, Highland; Mark C. Zelek, Kingston, all of N.Y.

[73] Assignee: International Business Machines Corporation, Armonk, N.Y.

[21] Appl. No.: 344,715

[22] Filed: Apr. 28, 1989

[51] Int. Cl.$^5$ .................. G11C 8/00; G06F 13/00
[52] U.S. Cl. .................. 395/425; 365/230.03
[58] Field of Search .................. 365/230.03

[56] References Cited

U.S. PATENT DOCUMENTS

| | | | |
|---|---|---|---|
| 3,618,045 | 11/1971 | Campbell | 364/200 |
| 4,325,120 | 4/1982 | Colley et al. | 364/200 |
| 4,755,971 | 7/1988 | Jasmer et al. | 365/230.03 X |
| 4,931,993 | 6/1990 | Urushima | 365/230.43 X |
| 4,937,791 | 6/1990 | Steele et al. | 365/230.03 |

Primary Examiner—Alyssa H. Bowler
Attorney, Agent, or Firm—Mark S. Walker

[57] ABSTRACT

A process of efficiently managing working storage that unifies the use of queues of fixed size free storage blocks and a global list of blocks of random size. The process implements continuous garbage collection that continually purges unused storage blocks from the fixed size queues to ensure maximum free storage availability. Data processing system throughput is enhanced by reducing the processor overhead required to allocate and return free storage blocks and by reducing the overhead required to manage temporary extensions of working storage.

13 Claims, 4 Drawing Sheets

UNIFIED WORKING STORAGE MANAGEMENT

BACKGROUND OF THE INVENTION

1. Field of the Invention

The present invention relates to data processing systems and is more particularly concerned with processes for memory space allocation and deallocation.

2. Background Information

Effective memory management is essential to the performance of complex software systems. Modern data processing systems typically have one or more central processing units (CPUs) which access an area of real storage provided for that data processing system. Memory space may be used for such things as control blocks, buffers, data areas and state vectors. Effective storage allocation is required to support software performance without greatly increasing the amount of real storage required. An effective dynamic storage allocation algorithm is required to insure that areas of memory are reused as they become available. Without effective reuse, additional permanently assigned storage would be required for each purpose to ensure a low probability of exhausting each storage type.

The rate of obtaining storage may be greater than a thousand times per second and overall system throughput may be adversely effected by the required storage allocation processing time. Unfortunately, storage efficiency and CPU efficiency are usually tradeoffs in the selection of a dynamic storage allocation algorithm. Storage inefficiency is a result of fragmentation, both internal, the result of giving out more storage than requested (e.g., by rounding up to some boundary), and external, the "checkerboard" effect caused by alternating blocks of available and in-use storage. Processing inefficiency results when it becomes necessary to extensively search for a storage block that will satisfy the request for free storage (or to search for the proper place to "insert" a released item), and can be measured by the mean number of blocks inspected per request or release.

There have been many discussions of different types of dynamic storage allocation systems. Donald Knuth in *The Art of Computer Programming*, Vol. 1: Fundamental Algorithms, 2nd Edition, Addison Wesley Publishing Company, Inc., copyright 1973, discusses a variety of dynamic storage allocation techniques. Knuth discusses linked list techniques where available free storage is linked by pointers from one available block to the next and various selection algorithms for determining which block to use in allocating to meet a storage request. Knuth also discusses the problem of returning a block to the free storage list and the need to collapse adjacent available areas together in order to compact memory and avoid fragmentation. The process of "garbage collection" where an attempt is made to identify any unused allocated storage blocks and to combine these into the free storage list is also covered.

Other techniques of memory management and garbage collection are known in the prior art. Venton et al., U.S. Pat. No. 4,121,286 discuss a system of memory space allocation and deallocation that employs a master capability table to track the use and allocation of storage. Venton et al. suggest a method of garbage collection relying on the use of garbage bits and visited bits to determine which storage blocks have been used by the system. The system must periodically inspect all storage blocks to determine whether some may be reclaimed as "garbage".

McEntee et al., U.S. Pat. No. 4,797,810 provide a system and method for incremental garbage collection in a virtual address space. McEntee et al. divide the memory into new and old portions and periodically copy objects from old to new portions of the memory and reclaim any unused space from the old space. This technique has the disadvantage of requiring substantially greater amounts of memory space than will be used by the processor.

Bozman et al. in "Analysis of Free-Storage Algorithms —Revisited" in the *IBM Systems Journal*, Vol. 23, No. 1, 1984, discuss a variety of free storage algorithms for use in the IBM VM/SP control program. Bozman et al. discuss a variety of methods which can be used to improve storage allocation efficiencies and to measure the relative performance of various methods. In particular, Bozman et al. discuss a dynamic storage algorithm employed with the IBM VM/370 product that uses fixed size queues containing free storage elements of particular size which can be rapidly allocated without searching. The fixed size queues allow the processor to immediately find a storage element of a given size without any requirement for searching a linked list. If the request cannot be satisfied from a queue, a search is made of the linked list of available storage blocks. Bozman et al. discuss the need for periodic garbage collection in which all of the free storage present in the fixed size queues is returned to the free list and the queues recreated. A major disadvantage of this present method is the requirement for periodic garbage collection by processing all entries in the queues.

SUMMARY OF THE INVENTION

The present invention is directed to a process of efficiently managing working storage by combining queues of fixed size blocks and a global list of blocks of random sizes. The present invention relates to a process for implementing continuous garbage collection to continually purge unused storage blocks from the fixed size queues. The process further employs pointers to the global storage list which speed any required search for blocks of a particular size if the request cannot be satisfied from the queues. As a result, the process of the present invention reduces the amount of processor time required to return a block of storage to the global list, reduces the amount of processor time required to manage temporary extensions of working storage, reduces the amount of total working storage required, and performs uniformly in a multiprocessor system.

DETAILED DESCRIPTION OF THE PREFERRED EMBODIMENT

Working storage is used by data processing systems to contain control blocks, buffers, data areas, and state vectors associated with the operation of the computer system in its execution of application programs or other work. Working storage is assigned from a portion of the physical memory of the data processing system. Physical memory typically is in the form of semiconductor memory. In a virtual memory environment, it can be augmented by a backing disk store.

A data processing system can consist of one or more processors which share a single physical memory. Each of the processors will run a plurality of tasks that continually demand for allocation of working storage and later release the working storage allocated. Dynamic storage allocation is essential for the effective reuse of areas of memory assigned to tasks for processing.

When a data processing system is first initialized, a certain portion of memory is dedicated as working storage. In the preferred embodiment, working storage is defined as an integer number of 4096 byte pages. This storage is then allocated and used for the process of dynamic storage allocation or memory management.

Certain peak conditions may result in a situation where the amount of working storage allocated is insufficient to meet the demands of the processors. In this situation, memory management functions can allocate additional working storage on a temporary basis. This is referred to as extended storage and is allocated, in the preferred embodiment, in 4096 byte page increments from other available areas of memory. For example, in the preferred embodiment, extended working storage allocations are made from the demand paging area.

Figure 1:
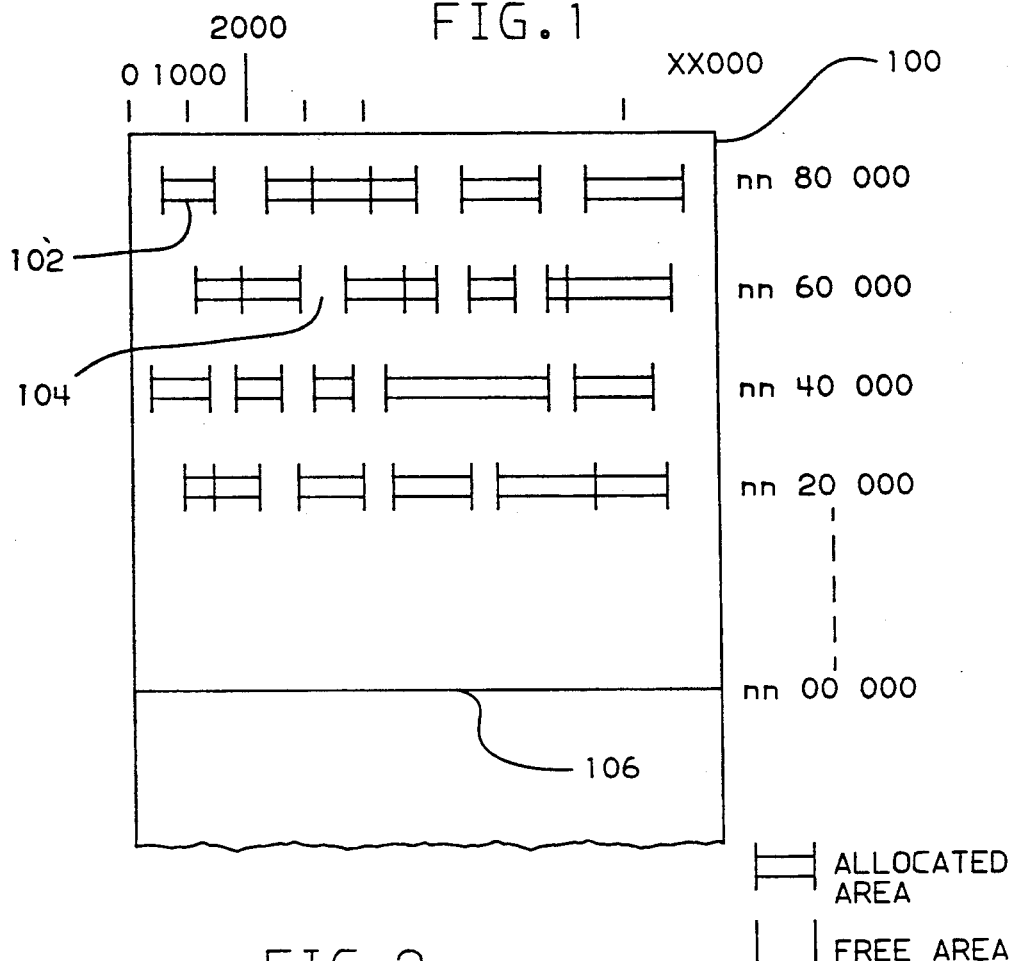
FIG. 1 is a representation of an area of memory containing allocated and free areas.

The entire working storage space is initially available for allocation to processor tasks. As the one or more processors process their tasks, storage allocation process will allocate storage blocks from the working storage area for each task. Each task will be allocated only the amount of storage needed for processing. A storage block of the necessary size will be split from working storage and allocated to the task. The remainder of working storage remains available to other tasks. As the processor completes its tasks, working storage blocks will be returned for reuse. Over time this will result in working storage containing a series of allocated and free areas. FIG. 1 is an illustration of a memory map of a working storage area and illustrates the effect of the allocation and deallocation activities. FIG. 1 illustrates an allocation process in which blocks are allocated in descending address order from the highest memory boundary 100. The total defined working storage is contained between the address at the beginning of free storage 100 and the address at the end of free storage 106. The preferred embodiment allocates working storage at the highest available address in memory and allocates from that point towards the beginning of memory. Other systems, however, may allocate working storage from lower address point and allocate towards a higher address. The present invention will operate in that environment as well.

The continued allocation and deallocation of storage blocks results in a checkerboard effect such as that shown in FIG. 1. A series of allocated storage blocks, such as 102, are separated by free areas or available blocks 104. This results in a great deal of fragmentation and wasteful use of storage. Storage inefficiency can be divided into two types of fragmentation. Internal fragmentation results when the storage allocation algorithm allocates more storage than requested through the process of rounding up the storage request to an arbitrary boundary. The end result is that allocated segments contain extra, unneeded storage space which could be more effectively used elsewhere. External fragmentation results when alternating blocks of available and in-use storage are created through the allocation and deallocation process. The available blocks scattered throughout the storage area may be too small to satisfy a request for working storage. However, in aggregate, they represent a significant loss in working storage capacity. Central processing unit (CPU) inefficiency results when the system must spend considerable time searching through the list of available storage for a storage block that will satisfy a request for working storage.

Available working storage blocks are typically managed as a linked list of addresses in memory. A global storage list will contain an entry for each working storage block available in a processing system. A header record points to the first available storage block in working storage. In the preferred embodiment, the first available block is found by starting at the highest memory address allocated to working storage and proceeding in descending address order. The first available storage block has a pointer pointing to the next available storage block in the descending address order. A linked list is developed with each available storage block pointing to the successive storage block with the last storage block containing an end of list indicator. For increased processing efficiency the global storage list is frequently implemented as a double linked list where each available storage block points to the preceding available storage block as well as the succeeding available storage block. The double linked format speeds the process of returning a block to the appropriate point in the list.

The major drawback to a dynamic storage allocation method based on a linked list of available storage locations is the amount of processor time required to search the list in order to find an available block. The search time may be considerable if each search begins at the beginning of the list and proceeds until an available block of the appropriate size is found. Because allocation of blocks starts at the beginning of free storage, the smaller fragments of storage tend to occur at the beginning of the list. This is because each time storage is allocated, only that amount of storage requested is actually allocated with whatever excess is available in the current block being broken off into a smaller fragment. These small fragments tend to aggregate towards the front of the working storage list. Thus, the search for a large working storage block will require significant processing to step through all entries until the larger storage block sizes are reached.

An alternative to the linked list is the use of queues of storage of fixed size. The computer system may be initialized with a given number of queues containing memory blocks of a given size. The present IBM VM/SP system operates with a number of these queues. In one version of the IBM VM/SP system, 92 queues are maintained for free storage elements less than or equal to 1024 double words (one double word is 8 bytes of bits each). Each of the first 63 queues is two double words wide and is maintained for free storage elements less than or equal to 126 double words such that the first queue services requests from one to two double words; and, similarly the second three to four double words; up to the 63rd servicing 125 to 126 double words. A second set of 29 queues each are 32 double words wide. All requests within this range are rounded up to the appropriate fixed-block size boundary. The purpose of these queues is to find a free storage element immediately thereby eliminating the requirement for searching a linked list. For example, when the processor receives a request for five double words of working storage, a single access to the appropriate queue returns the address of the next available storage block of at least five double words.

The queues are managed on a last-in first-out basis. Thus, when a storage block is returned to the available list, it is placed at the top of the queue or queue and thus becomes the next available block for allocation from that queue. Over time, this may result in the accumulation of storage blocks in the queues that are never referenced. For example, a processor may typically require 100 blocks in the six double word size over a period of time. Due to a particular processing surge, this number may be increased to 300 for a short period of time. When the processors return to the normal requirement for 100 storage blocks, the extra 200 storage blocks will remain in the queue but will never be used. This results in inefficient use of the storage.

The prior art systems employ a technique known as "garbage collection" to recover the unused storage blocks. The garbage collection process attempts to detect all unused entries and return them to the free list so that they may be allocated as efficiently as possible. In the prior art versions of IBM VM/SP, garbage collection was performed whenever a user logged off the system thereby releasing blocks to working storage, or at least once every two minutes. At this point, all working storage blocks that have been in the queue at least one minute (or less if the amount of storage in the queue exceeds a threshold), or are from extended storage, are returned to the global storage list and the fixed size queues rebuilt anew. The disadvantage of this periodic garbage collection is the increased processor workload required to place all items back on the free list and then to begin rebuilding the fixed size queues.

In the current IBM VM/SP operating system a request that cannot be satisfied by a fixed size queue causes a search to be made of a linked list of available storage blocks. This list is called a free list and is maintained in order of increasing address. The list is ordered by storage address in order to facilitate the coalescing of a newly freed block with adjacent free blocks. If the free list is empty or cannot satisfy the request, a page (or multiple pages if the requested working storage size is large) is "borrowed" from the paging area that provides real memory to users and the operating system. The borrowed page is referred to as a "extended" page. Whenever a release of block causes an extended page to be completely contained in the free list, that page is returned to the paging area. Because the dedicated dynamic storage is initially generated at the top of memory (i.e., the highest addresses), all available blocks from extended pages will be at the front of the free list.

The present invention relates to a process for dynamic memory allocation that overcomes the limitations of the previous IBM VM/SP memory allocation process. In particular, the present invention implements a method of continuous garbage collection that avoids the need to periodically purge the fixed size queues and to rebuild the queues from an empty condition. In addition, the present invention provides a process for reducing the processor time required to allocate and deallocate a working storage block.

Overview

Figure 2:
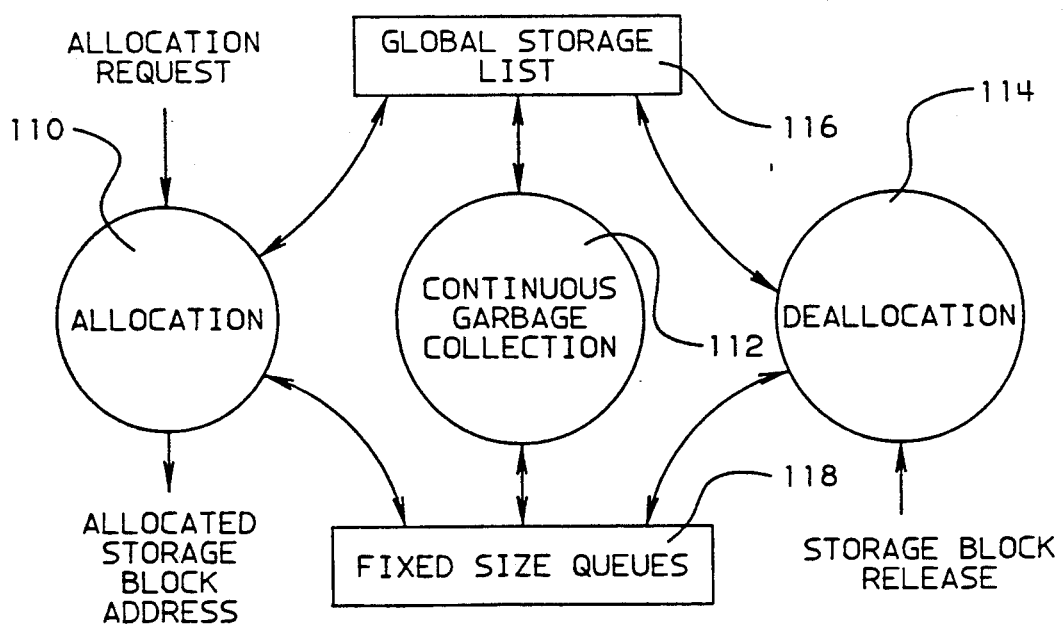
FIG. 2 is a chart representing the data flow and functions of the method of the present invention.

The dynamic storage allocation process is shown in terms of basic functions in FIG. 2. The three primary functions are the allocation of the working storage block 110, the deallocation of a working storage block 114, and continuous garbage collection 112. Supporting this process is a global storage list 116, a linked list of available storage addresses, and a set of working storage fixed size queues 118. In the preferred embodiment, each processor in a multiprocessor system has its own set of fixed size queues. The present invention, however, will operate effectively with a single set of queues supporting several processors.

A number of control variables are maintained for each queue of fixed size blocks. These variables include the number of blocks currently available in the queue; the number of blocks of this size allocated from the global storage list but not yet returned to the global storage list; the address of the first block on the global storage list that might satisfy a request for a block of this size (all blocks between it and the beginning of the list are too small to satisfy a request); and a spill address used to implement continuous garbage collection when returning blocks. In the preferred embodiment, the number of blocks in each queue is maintained for each individual queue, the other control variables are kept in a global table with one entry for each block size. The number of blocks allocated from the global storage list but not yet returned is calculated by monitoring the number of blocks of this size allocated of the global storage list and subtracting from this the number of blocks from this size returned to the global storage list.

Each of the processes shown in FIG. 2 will be discussed in detail. When the system according to the present invention is initialized, all available working storage is placed as a single block addressed by the global storage list. Each of the required queues is initialized but is empty, containing no addresses of fixed size storage locations.

Allocating a Storage Block

Figure 3:
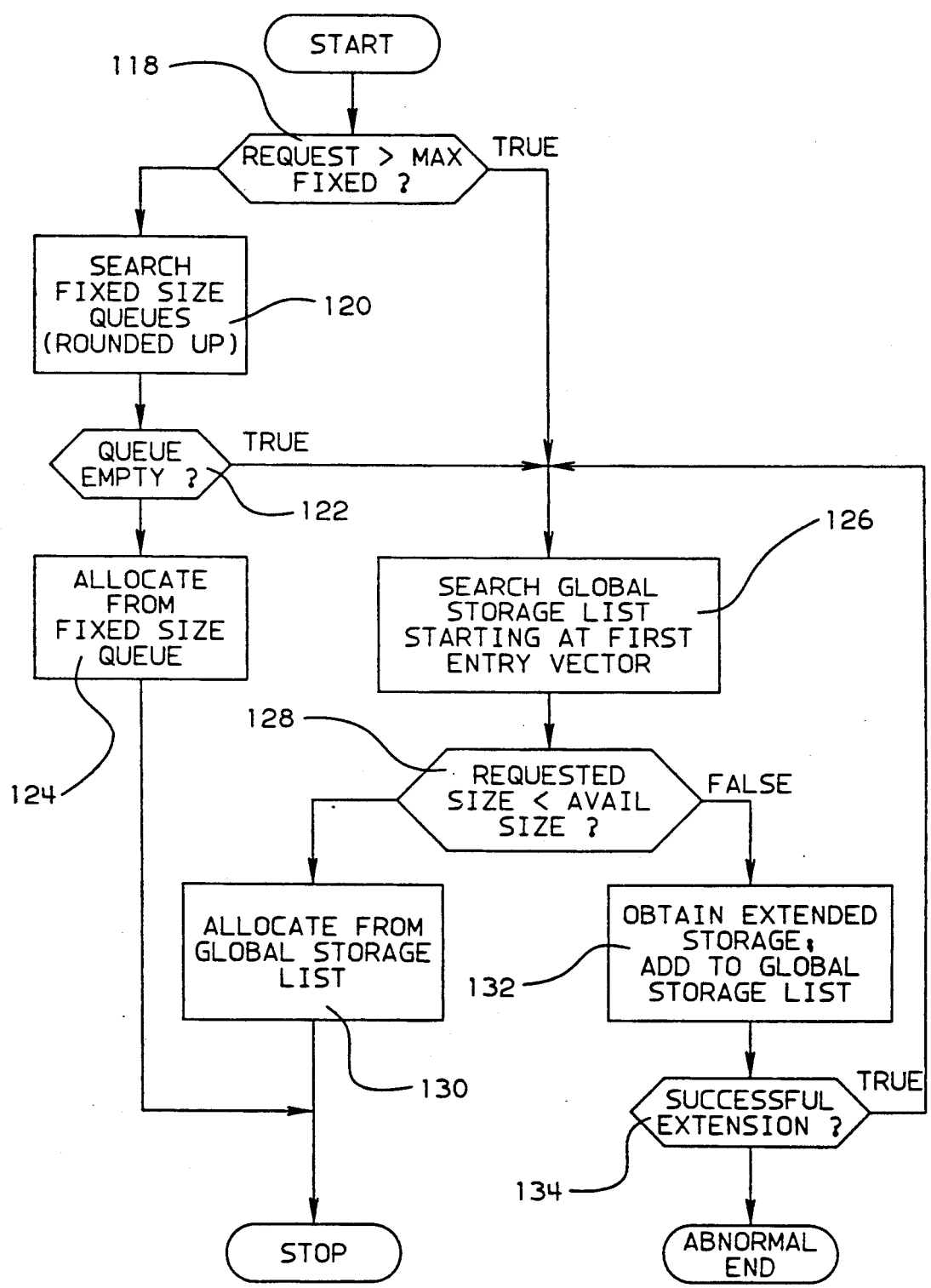
FIG. 3 is a flow chart showing the process of allocation of a storage block according to the present invention.
Figure 4:
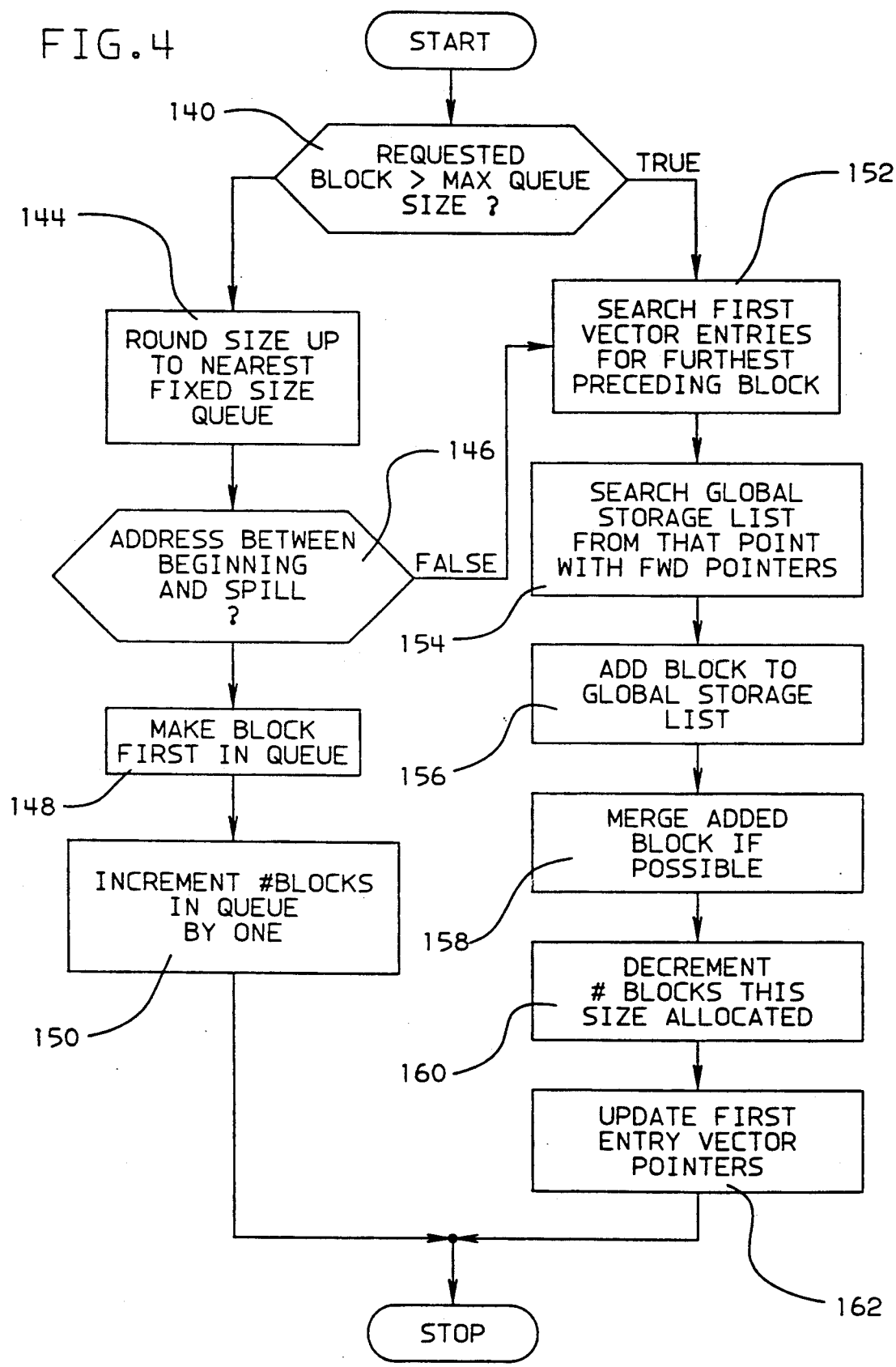
FIG. 4 is a flow chart showing the process of returning a block to storage according to the present invention.

FIG. 3 is a flow chart of the allocation process for obtaining a working storage block according to the present invention. The system or application generates the request for an allocation of a working storage block of a given size. An attempt is made to first obtain the block from an appropriate queue of fixed size blocks 120, if the size of the requested block is not greater than the largest fixed size in the queues. The size of the requested block is rounded up to the smallest fixed size block that is large enough to contain the requested block.

The dynamic storage allocation process first determines whether the queue containing blocks of that size is empty, and if empty returns an unsuccessful search condition. If the queue is not empty, the first block from the queue is removed and used to satisfy the temporary storage block request 124. The request is satisfied by passing the address of the storage block that is available to the system or application. The dynamic storage allocator then subtracts one from the number of blocks in the queue of that fixed size In the preferred embodiment, in a multiprocessor system with a set of queues for each processor, each processor attempts to satisfy the request from its own queue. If unsuccessful, it then attempts to satisfy the request from the other processor queues.

If allocation from the queue is unsuccessful, an attempt is made to allocate a block from the global storage list 126. The first block pointer or first entry vector from the fixed size queue of the requested size is used as the starting point for the search of the global storage list. If the requested storage block size is larger than the largest fixed size queue, the search is started at the address contained in the first entry vector for that largest size queue.

The search proceeds by following the forward pointers through successive storage blocks in the global storage list. If the end of list marker is encountered before finding a block that can satisfy the request, the search is terminated as unsuccessful.

If a storage block is found which is larger than the requested size 128, then the requested storage block is allocated from the end of the free storage block nearer the beginning of the global storage list 130. The first entry vector address for the fixed size queue of this size is reset to be the address of the remainder of the free storage block. If the free storage block is equal in size to the requested size, then the first entry vector address is set to the address of the next block on the global storage list. Upon allocation, the number of blocks of this size allocated from the storage global list is incremented by 1.

The first entry vectors of the other fixed sized queues must be adjusted so that each of the first entry vectors points to a block that exists in the global storage list and the first entry vector for a given size does not precede the first entry vector for any smaller size.

Finally, the spill address for the fixed size queue of the requested size is adjusted as follows. If the block is the only one of this size that has been allocated, the spill address is set equal to the address of this block. Otherwise, the spill address is set equal to either the address of the block just allocated or the existing spill address, whichever is further from the beginning of the global storage list.

If the request for allocation of a storage block cannot be satisfied from global storage list, additional storage must be obtained and added to the global storage list 132. If additional storage cannot be obtained 134, then the allocation process ends unsuccessfully. In the preferred embodiment, additional storage, termed extended storage, will be obtained from the demand paging area. The additional storage will be added to the global storage list and the above steps of searching and allocating from the global storage list will be repeated.

Returning a Block

Storage blocks used by a task may be explicitly or implicitly deallocated and returned to free storage. A storage block may be explicitly deallocated by a task leading to a request for deallocation. In other circumstances, termination of a task may implicitly result in deallocation of a free storage block.

The size of the block to be returned is first examined 140 and, if larger than the largest fixed size queue, the block is returned directly to the global storage list. The process for returning a block to the global storage list is described later.

If the block is not larger than the largest queue size, the size of the block to be returned is rounded up to the nearest size of a fixed queue 144. The address of the block to be returned is compared to the beginning address of the global storage list and the spill address for blocks of the rounded size 146. If the address of the block to be returned is between the beginning of global storage and the spill address then the block is returned to the fixed size queue. Since the fixed size queue is managed on a last-in first-out basis, the return block is made the first block in the queue and the counter containing the number of blocks in the queue is incremented by 1.

If the address of the block to be returned is not in the beginning to spill address range, the block is returned to the global storage list.

The storage block to be returned must be inserted into the global storage list at the correct point. In the preferred embodiment the global storage list is ordered by descending memory address. The proper point for insertion can be determined by stepping through the global storage list until the appropriate point is found. In the preferred embodiment, performance improvement is obtained by first using the first entry vectors contained in each of the fixed size queues to find the first entry vector address furthest from the beginning of the global storage list but preceding the block to be returned 152. Starting at the address of the first entry vector the global storage list is searched in the forward direction until the correct address for the block being returned is found 154. The return storage block is then added to the global storage list 156, merging it with adjacent free storage blocks if possible to create a larger free storage block 158. The counter containing the number of allocated blocks of the size returned is decremented by one 160. The first entry vector pointers in all fixed size queues must be updated to reflect the return block 162. For all fixed size queues that contain blocks the same size as a resulting merged block or smaller, if the first entry vector points to an address within the merged block, the address is set equal to the address of the merged block. If the first entry vector points to a block that follows the merged block, it is replaced it with the address of the merged block.

Continuous Garbage Collection

Garbage collection is a process whereby unused storage blocks are returned from the fixed size queues to the global storage list. Garbage collection is required because over time the fixed size queues may accumulate a larger number of storage blocks than is required to satisfy the typical demand for storage. Storage blocks in the fixed size queues are not available to be coalesced into larger blocks or to be subdivided into smaller blocks. This results in inefficient use of working storage. Only when a storage block is placed in the global storage list can it be merged or split supporting current storage demand characteristics. One of the disadvantages of prior art memory management systems that employ fixed size queues is that garbage collection is periodically required. This causes a halt to processing while the fixed size queues are scanned and free storage is returned to the global storage list. The present invention overcomes this disadvantage by providing continuous garbage collection.

The preferred embodiment of the present invention provides a method for evaluating whether or not a returning storage block should be placed in a fixed size queue or returned immediately to the global storage list. The present invention relates to implementing continuous garbage collection by means of a spill address. The spill address for each fixed size queue specifies an address beyond which any returning block will be returned to the global storage list. The spill address is adjusted to reflect the processor demand for storage blocks of a particular size. By periodically adjusting the spill address the processor can adapt to changing patterns of data storage block usage. The periodic recalculation of the spill address and the resulting continuous garbage collection requires far less processor time than the periodic garbage collection of prior art systems.

The recalculation of the spill address attempts to minimize the amount of storage contained in the fixed size queues while providing a sufficient number of blocks in the queues to satisfy the typical demand efficiently. The process for recalculating the spill addresses for each of the fixed size queues operates as follows.

A new spill address is calculated for each fixed size queue by adding the sum of the amount of storage contained in the blocks of the queue to the old spill address. In the preferred embodiment, storage is allocated in descending address order and the addition of the amount of storage in the queue to the old spill address tends to move the spill address to the beginning of the global storage list. The system could also be implemented using a global storage list in ascending address sequence by subtracting the sum of the storage amounts.

For each fixed size queue except the queue with the largest size blocks, if blocks are available in the queue with the next larger size, the new spill address is set to the larger of the spill address just computed for this fixed size queue and the spill address of the next larger fixed size queue. This also tends to move the address towards the beginning of the global storage list. Finally, for all fixed size queues, if the address of the first block in the queue does not lie between the new spill address and the beginning of the free storage area, the block is returned to the global storage list.

Figure 5:
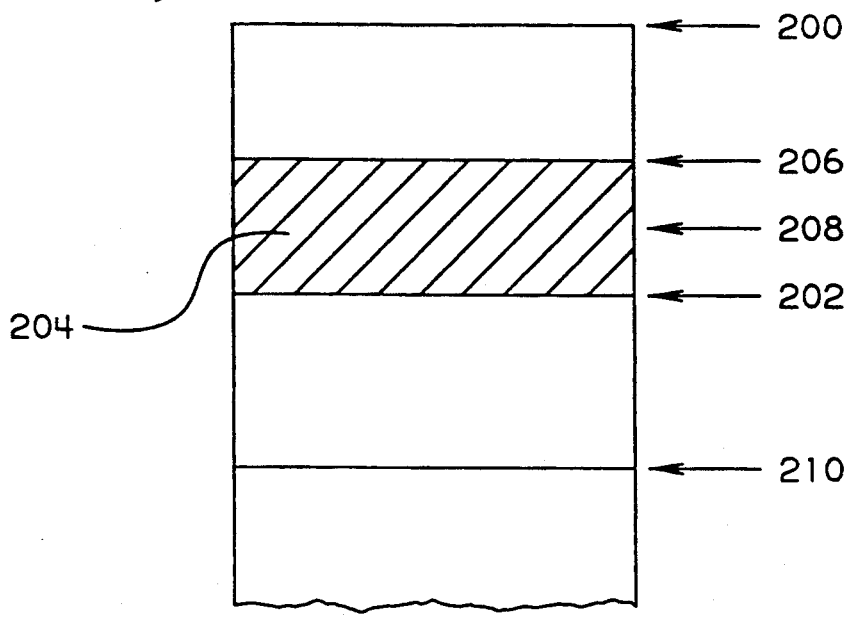
FIG. 5 is an illustration of free storage and the relative spill address positions.

FIG. 5 illustrates the recalculation of the spill address. The beginning of free storage 200 points to the largest address in the system in the preferred embodiment. Old spill address 202 is maintained for a specific fixed size queue i. Block 204 represents the sum of the amount of memory allocated to blocks in fixed size queue i. The new spill address for the fixed size queue 206 is calculated by adjusting the old spill address by the amount of memory 204. The new spill address is then compared to the spill address of the next larger fixed size queue i+1 208. In the preferred embodiment the greater new spill address, the one closer to the beginning of free storage, is retained as the spill address for fixed sized queue i.

Free Storage Extension

The amount of free storage initially assigned is typically sufficient for normal demand. Additional storage may be required to satisfy free storage requests when demand is higher than anticipated. During these periods a request for free storage should be satisfied with as small an impact on program and system performance as possible. In order to minimize this impact, free storage extension must occur only when needed, must assign as little additional free storage as possible to meet the demands, must consolidate unused extended free storage as quickly as possible to allow its release back to the system, and must avoid frequent cycles of extending and then immediately releasing storage followed quickly by another extension and release cycle.

The present invention provides a means for controlling the extension of free storage and is implemented as follows. The fixed size queues provide a short term buffer for changes in storage demand. Continuous garbage collection returns unused blocks to the global storage list for reallocation. The continuous nature of the garbage collection ensures that the global storage list contains as much storage for allocation as possible and tends to reduce the demand for temporary extensions of free storage. The global storage list in the preferred embodiment is ordered with the preferred storage blocks first. In the preferred embodiment, the storage blocks preferably allocated are those initially assigned free storage area blocks. The extensions to free storage will have a lower address and will be placed nearer the end of the global storage list and hence will be the last to be allocated.

This implementation results in free storage being extended only when there is nothing in the fixed size queues or global storage list to satisfy the request, and only when the existing free storage is not adequate.

In the preferred embodiment free storage is managed in units of fixed size called "pages" or "paragraphs". In the IBM System/370 environment pages each contain 4096 bytes. If the request for free storage that cannot be satisfied by the currently allocated storage will fit within one additional unit of storage, free storage is extended by one unit of storage. If the current request will require several units of storage, free storage is extended using a single contiguous block with the smallest number of units required to satisfy the request.

Extensions to free storage are usually required when demand for all storage used by a program is high. The additional free storage must be taken from memory areas already in use for other purposes. To avoid long lasting disruptions in program activity, unused free storage should be consolidated and returned to its original use as soon as possible. To accomplish this return, blocks in extended free storage should be returned to the queues of fixed size blocks only during long periods of high demands. When the program requires less storage, blocks in the extended free storage area should be the first blocks returned to the global storage list.

Continuous garbage collection using the spill address works best when free storage is contiguous. Because of other program requirements the storage available to extend free storage may, however, not be contiguous with the existing free storage. The free storage allocation and continuous garbage collection processes operate slightly differently when managing extended free storage.

In the free storage allocation process an unsatisfied request for free storage will cause an extension of free storage by the system. The extended free storage units selected are those nearest the initial block of free storage. This assists in the process of consolidating extended free storage and returning it to the system.

The continuous garbage collection mechanism encourages the assignment of contiguous storage for free storage by returning blocks in non-contiguous free storage areas directly to the global storage list. This is done by computing a virtual end of free storage address which is the address that would the end of free storage if all free storage were contiguous. If a spill address lies beyond the virtual end of free storage, it is set equal to the virtual end of free storage and causes returning blocks to be added to the global storage list. By forcing the return of allocated blocks to the global storage list, consolidation of blocks of extended storage is encouraged and leads to the return of extended storage units to the system as soon as possible.

Figure 6:
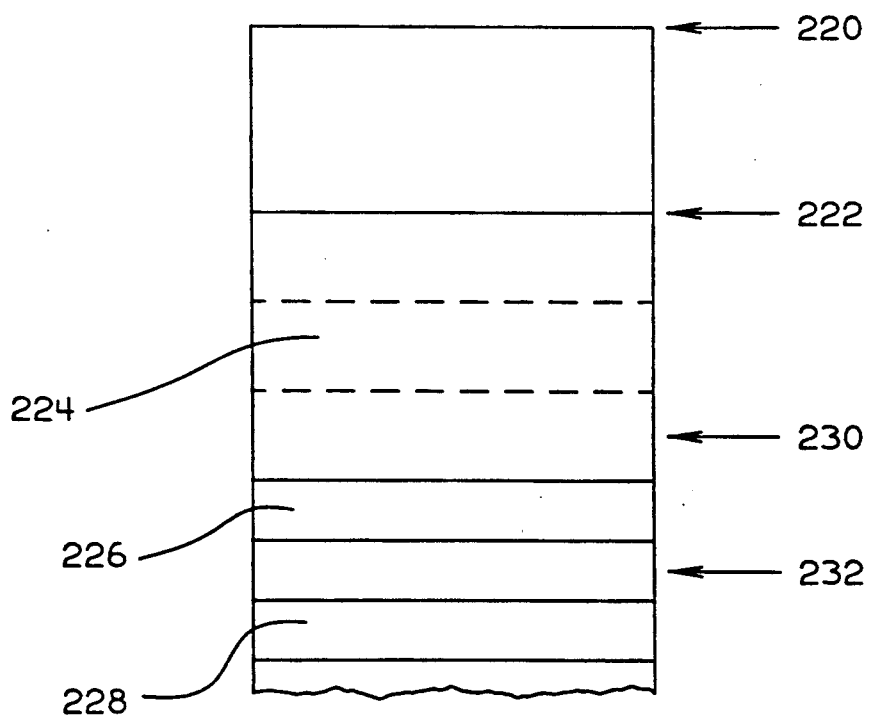
FIG. 6 is an illustration of free storage with non-contiguous extensions.

The process of determining the virtual end of free storage is illustrated in FIG. 6. Free storage, in the example, was initially defined by the system beginning at location 220 and extending through the end of free storage 222. Extended free storage blocks 224, 226 and 228 are allocated from additional storage but are not contiguous with initial free storage or with each other. Virtual end of free storage 230 is calculated by adjusting the end of free storage address 222 by the sum of the space allocated to blocks 224, 226, and 228. Calculated spill address 232, further from the beginning of storage 220 than the virtual end of free storage 230 is set equal to virtual end of free storage 230 in order to encourage the return of storage blocks to the global storage list. Thus, the return of blocks 226 and 228 will result in them being placed on the global storage list. Returning block 224 will be placed in the appropriate fixed size queue if it satisfies the other conditions.

Extending free storage and releasing extended free storage are usually complicated processes. These processes do not directly contribute to accomplishing the task of a system but absorb processor and storage resources that could be more productively employed in other tasks. Global program resources are redistributed when extending free storage and releasing extended free storage. In a multiprocessor system, only the processor performing this task can run without restraint. Until it is finished, all other processors must be stopped or restricted in their operation. Thus, frequent cycles of extending and releasing free storage should be avoided. Once obtained, extended free storage should be released only when it is not needed to satisfy relatively long term demand.

The present invention manages the extend and release cycle problem by not releasing global storage list blocks in extended free storage immediately when they are large enough to release. Instead, the process according to the present invention periodically scans the global storage list and releases those blocks in extended free storage that are large enough to be released. In the preferred embodiment, the scanning of the global storage list occurs every fourth time the spill addresses are recalculated.

In the preferred embodiment, the scan of the global storage list begins at the end of the list and follows the backward pointers towards the head of the list. While the scan of the global storage list could be implemented as a forward scan starting at the beginning of the list, a backward scan results in a shorter scan and increased processor efficiency.

The scan of the global storage list ends when the next block is within the initial block of allocated free storage or when it has an address that lies between the beginning of the global storage list and the first block that can satisfy the request for the minimum size being released. During the scan each block in extended free storage is evaluated and a determination made whether all or part of it can be released to the system. As much of the extended storage is released as possible without leaving blocks that are smaller than the minimum sized block on the global storage list.

Multiprocessor Performance

In a multiprocessor system, a processor requires exclusive use of any resource such as storage that is shared with another processor whenever the first processor needs to change the resource or the processor performs a task that could be disrupted if another processor changes resource. While one processor has exclusive use of a resource, the other processors must wait until the first processor is finished. During this wait, no useful work is performed. A processor requires exclusive use of the global storage list whenever it changes the list by inserting, removing, or changing a block or searches the list to locate a specific block. A processor requires exclusive use of a fixed size queue whenever it adds a block to the queue, removes a block from the queue, or performs garbage collection.

The memory management process of the present invention improves multiprocessor performance by remembering the state of the global storage list between searches. Each search benefits from the results of previous searches in the following ways. A search to allocate begins at the first block that might satisfy the request and skips all blocks before it. This is accomplished by use of the first block or first entry vector address to begin a search. Secondly, a search to return a block begins close to the place where the block will be inserted, again by using the first entry vector. Thus, a processor employing the present invention for free storage management requires exclusive access to the global storage list for a shorter period of time. In addition, a scan of all blocks in a fixed size queue is not required during garbage collection requiring less exclusive access time to the queue.

The above description is of one embodiment only and is not intended to be limiting to the invention. Alternative arrangements will be seen by those skilled in the art, for example by changing the ordering of global storage list, and the management of the fixed size queues. These and other changes are deemed to be included within the scope of the invention.

We claim:

1. A process for controlling memory in a data processing system of the type including one or more processing units and a memory, said data processing system executing a plurality of tasks with each task issuing one or more requests for memory of a specified size, wherein a portion of said memory is designated working storage, wherein the data processing system maintains a plurality of queues, each queue containing an ordered list of addresses of working storage blocks of a specified size, and wherein the data processing system maintains an ordered free storage list containing the addresses of all working storage blocks not in the plurality of queues and ordered by said addresses, the process comprising the steps of:

allocating a working storage block to one of said plurality of tasks in response to a request for memory of a specified size, said allocating step determining a working storage block address of a working storage block of at least said specified size;

determining periodically a spill address for each of said plurality of queues as a function of the amount of storage addressed by said queue, said spill address representing a limiting address controlling placement of deallocated working storage blocks in one of said plurality of queues or in said free storage list;

deallocating an allocated working storage block having an address and size when no longer required by said one of said plurality of tasks;

testing each of said plurality of queues and selecting one of said plurality of queues having a size larger than the size of said deallocated working storage block;

inserting the address of said deallocated working storage block in the selected one of said plurality of queues, when said working storage block is deallocated as long as the address of said working storage block is between the beginning of working storage and said spill address and said size of said working storage block is less than or equal to the largest size block specified for any queue; and inserting said address as an address entry in said free storage list otherwise.

2. The process of claim 1, wherein said step of determining periodically a spill address for each of said plurality of queues comprises the steps of:

setting said spill address equal to the address of a working storage block upon allocation by said data processing system if said block is the only block of the specified size that has been allocated;

setting said spill address equal to the address of said allocated block upon allocation by said data processing system if said address is further from the beginning of said free storage list than a current queue spill address, otherwise maintaining the current queue spill address;

modifying periodically said spill address of said queue by determining the total amount of storage addressed by said queue and adjusting the spill address to be closer than said current spill address to the beginning of said free storage list by said total amount.

3. The process of claim 2, further comprising the steps of:

testing a first address in said ordered list of addresses for each of said plurality of queues against the spill address determined for that queue; and inserting into said free storage list the addresses of all storage blocks in each of said queues and removing them from said queues if said modified spill address for that queue is nearer the beginning of said free storage list than the first block in said ordered list.

4. The process of claim 1 wherein the step of inserting the address of said deallocated working storage block into the one of said queues comprises the steps of:

inserting said address as the first entry in said queue; and shifting all previous entries to subordinate positions in said queue.

5. The process of claim 1 where the step of inserting said address into said free storage list comprises the steps of:

traversing said ordered free storage list comparing the address of the deallocated working storage block with a current free storage list address and an adjacent previous free storage list address until said deallocated storage block address is between said current and said previous free storage list addresses; and inserting the address of the deallocated working storage block between said previous address and said current address.

6. The process of claim 5 wherein each entry in said ordered free storage list has a forward pointer indicating a next adjacent entry to said entry in said ordered list and a backward pointer indicating a previous adjacent entry to said entry in said ordered list, and wherein the step of inserting into said free storage list comprises the steps of:

traversing said ordered free storage list using the forward pointers of each entry in said working storage list until an entry is found whose address is nearer the beginning of the ordered list than the deallocated block and whose forward pointer points to a block with an address farther from the beginning of the list then the deallocated block;

modifying the forward pointer of the located block to be equal to the address of the deallocated block;

modifying the forward pointer of the deallocated block to be the address of the block previously pointed to by the located block;

modifying the backward pointer of the deallocated block to be the address of the located block; and modifying the backward pointer of the block previously pointed to by the located block to be the address of the deallocated block.

7. The process of claim 5 wherein each of said plurality of queues contains a block entry pointer to the ordered free storage list indicating the first working storage block potentially having available storage blocks of the size stored in said queue and wherein the step of examining the forward pointers is preceded by the steps of:

examining the block entry pointer of each of said plurality of queues to determine the largest pointer less than the address of said deallocated working storage block; and beginning examining at the free storage list entry pointed to by said block entry position.

8. The process of claim 1 wherein each of said plurality of queues contains a block entry pointer to the ordered free storage list indicating the first working storage block potentially having available storage blocks of the size stored in said queue.

9. The process of claim 1, further comprising the steps of:

testing free storage list entries adjacent to said address entry inserted in said free storage list to determine whether or not a working storage block at one of said adjacent addresses is contiguous with the working storage block at said inserted address; and merging said adjacent working storage block with said inserted working storage block if it is contiguous.

10. The process of claim 9, wherein the step of merging comprises the steps of:

comparing said adjacent address with said inserted address and selecting as a new block address the address closest to the origin of working storage;

summing the sizes of the adjacent and inserted working storage blocks and assigning the sum as the size of the new block; and deleting the address entry not selected in the comparing step from the free storage list.

11. A process for controlling the allocation and deallocation of memory space in a data processing system of the type including one or more processing units and a memory, said data processing system executing a plurality of tasks with each task requiring allocation of a portion of said memory to said task by issuing one or more requests for allocation of a storage block, said process comprising the steps of:

designating a block of memory of predetermined size as free storage, said free storage block having a beginning address and capable of being divided into a plurality of storage blocks each having an address;

establishing a free storage list containing the addresses of all unallocated storage blocks in said free storage;

establishing a plurality of queues, each queue designated to contain entries of available storage blocks of a different fixed size and each having a spill address;

performing the following steps for each request for allocation of a storage block of a requested size by one of said tasks;

determining whether an available storage block exists in a fixed size queue containing blocks of storage of the nearest larger size than said requested size;

if said queue is empty and said free storage is at least as large as said requested size, allocating storage of said requested size from said free storage;

if said free storage is not as large as said requested size, obtaining extended storage and allocating storage of said requested size from said extended free storage;

resetting said spill address for said fixed size queue of the nearest larger size as the address of said allocated storage, if said storage is the only one of said size allocated; otherwise resetting said spill address as the address of storage just allocated or the old spill address, whichever is further from beginning address of free storage;

performing the following steps for each deallocation of a storage block of a size given;

inserting said storage block into said free storage list if the size of said storage block is greater than the size of the largest size fixed size queue;

rounding said given size to the nearest larger fixed size queue;

inserting said storage block into said fixed size queue, as the first element in said queue if the address of said storage is between said beginning address of free storage and said spill address; otherwise inserting said storage into said free storage list;

modifying periodically each of said spill addresses of said fixed size queues by determining the total amount of storage contained in all storage blocks in said queue, and adjusting said spill address closer to said beginning address of free storage by said total amount;

returning storage from said fixed size queue to said free storage list if the address of said first block of storage in said queue is not between the beginning address of free storage and said adjusted spill address.

12. The process of claim 11, further comprising the steps of:

testing free storage list entries adjacent to said address entry inserted in said free storage list to determine whether or not a working storage block at one of said adjacent addresses are contiguous with the working storage block at said inserted address; and merging said adjacent working storage block with said inserted working storage block if it is contiguous.

13. The process of claim 12, comparing said adjacent address with said inserted address and selecting as a new block address the address closest to the origin of working storage;

summing the sizes of the adjacent and inserted working storage blocks and assigning the sum as the size of the new block; and deleting the address entry not selected in the comparing step from the free storage list.

* * * * *